US012697680B2

(12) United States Patent
Aoyagi et al.

(10) Patent No.: US 12,697,680 B2
(45) Date of Patent: Aug. 4, 2026

(54) METHOD OF MANUFACTURING METAL COMPONENT AND LASER WELDING APPARATUS

(71) Applicant: TOYOTA JIDOSHA KABUSHIKI KAISHA, Toyota (JP)

(72) Inventors: Hikaru Aoyagi, Miyoshi (JP); Hisanori Kaminaga, Komaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 789 days.

(21) Appl. No.: 18/183,302

(22) Filed: Mar. 14, 2023

(65) Prior Publication Data

US 2023/0330776 A1 Oct. 19, 2023

(30) Foreign Application Priority Data

Apr. 13, 2022 (JP) ................................. 2022-066132

(51) Int. Cl.
    *B23K 26/067* (2006.01)
    *B23K 26/064* (2014.01)
    *B23K 26/26* (2014.01)
(52) U.S. Cl.
    CPC ........ *B23K 26/067* (2013.01); *B23K 26/0648* (2013.01); *B23K 26/0676* (2013.01); *B23K 26/26* (2013.01)
(58) Field of Classification Search
    CPC ............................. B23K 26/06; B23K 26/0676
    See application file for complete search history.

(56) References Cited

U.S. PATENT DOCUMENTS

| | | | |
|---|---|---|---|
| 8,803,029 B2 * | 8/2014 | Forrest ............... | B23K 26/0604 |
| | | | 219/121.76 |
| 2008/0029498 A1 * | 2/2008 | Forrest ................ | B23K 26/067 |
| | | | 219/121.73 |
| 2009/0191693 A1 * | 7/2009 | Iizuka .................... | H10P 54/00 |
| | | | 257/E21.349 |

(Continued)

FOREIGN PATENT DOCUMENTS

JP          H09300087 A * 11/1997
JP          11-179582 A      7/1999

(Continued)

*Primary Examiner* — Topaz L. Elliott
(74) *Attorney, Agent, or Firm* — Oblon, McClelland, Maier & Neustadt, L.L.P.

(57) ABSTRACT

The method of manufacturing a metal component includes: generating a laser beam; splitting the laser beam into a first laser beam and a second laser beam; reflecting the second laser beam; irradiating the first laser beam through a first condensing optical system to an irradiation position on a surface of a workpiece made of metal, wherein the first condensing optical system condenses the first laser beam; irradiating the second laser beam through a second condensing optical system to the irradiation position, wherein the second condensing optical system condenses the second laser beam; adjusting a spot diameter ratio, wherein the spot diameter ratio is a ratio of a first spot diameter to a second spot diameter, wherein the first spot diameter is a diameter of the first laser beam on the irradiation position, wherein the second spot diameter is a diameter of the second laser beam on the irradiation position; and moving the irradiation position to weld the workpiece.

5 Claims, 12 Drawing Sheets

(56)                    References Cited

U.S. PATENT DOCUMENTS

2023/0110940 A1*   4/2023   Matsumoto .......... B23K 26/244
                                            219/121.6
2024/0139867 A1*   5/2024   Haug ................. B23K 26/0676

FOREIGN PATENT DOCUMENTS

| JP | 2000-317667 | A | | 11/2000 |
|----|----|----|----|----|
| JP | 2002263873 | A | * | 9/2002 |
| JP | 2006-326640 | A | | 12/2006 |
| JP | 2012-110905 | A | | 6/2012 |
| JP | 2018-202478 | A | | 12/2018 |
| JP | 2020-44543 | A | | 3/2020 |

* cited by examiner

Figure 4:
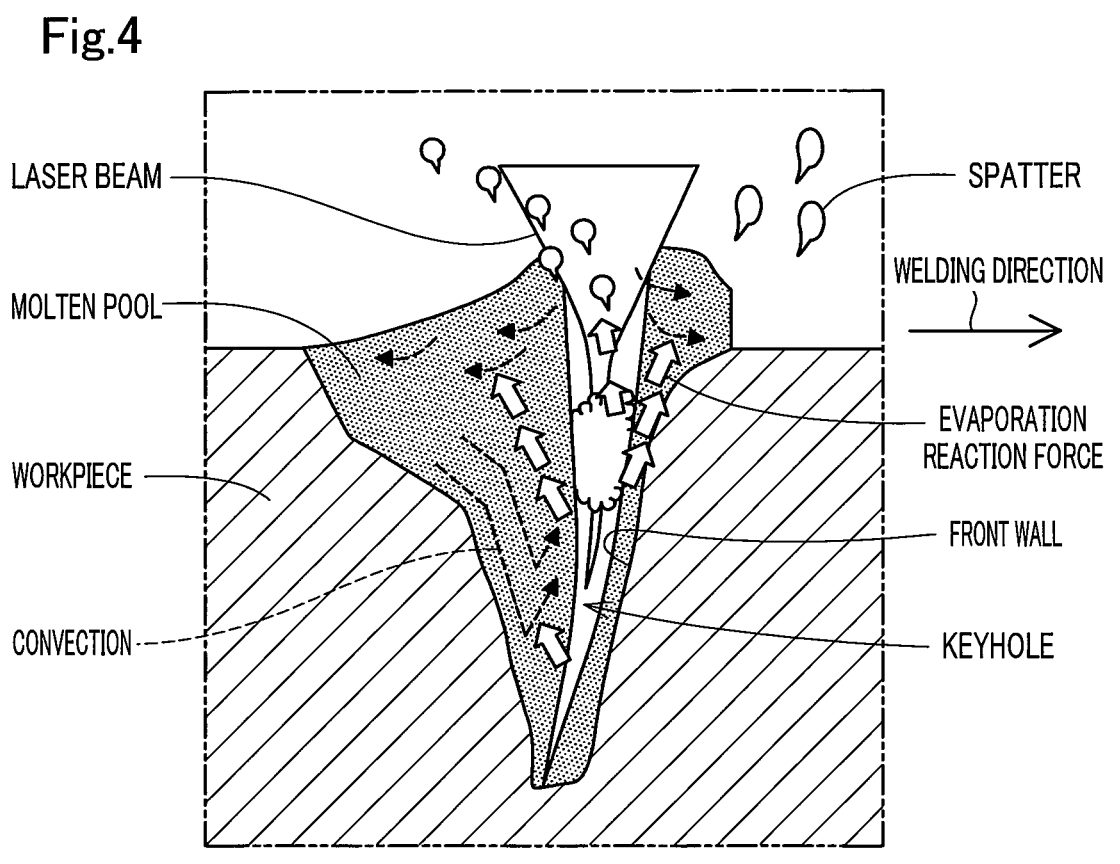

LASER BEAM

SPATTER

MOLTEN POOL

WELDING DIRECTION

WORKPIECE

EVAPORATION
REACTION FORCE

FRONT WALL

CONVECTION

KEYHOLE

METHOD OF MANUFACTURING METAL COMPONENT AND LASER WELDING APPARATUS

CROSS REFERENCE TO RELATED APPLICATIONS

This application claims priority to Japanese Patent Application No. 2022-066132, filed Apr. 13, 2022, the disclosure of which is incorporated by reference herein in its entirety.

BACKGROUND

Field

The present disclosure relates to a method of manufacturing a metal component and a laser welding apparatus.

Related Art

Patent Document 1 discloses a laser welding method for welding a workpiece while suppressing the occurrence of spatter by irradiating two laser beams simultaneously on the workpiece. In this laser welding method, two laser beams are irradiated to the workpiece along the same optical axis, the other laser beam is irradiated to the central portion of the portion of the workpiece which one of the two laser beams are irradiated.

Patent Literature 1: JP 2020-044543 A

In the laser welding method described above, since the two laser beams are irradiated to the workpiece along the same optical axis, for example, by changing the focal length of the condensing optical system for focusing the two laser beams it is possible to change the spot diameter of the two laser beams at once. However, in the laser welding method described above, it is impossible to change the ratio of the spot diameter of the two laser beams even when changing the focal length of the condensing optical system. Therefore, easily adjustable technology the ratio of the spot diameter of the two laser beams in accordance with the material and the required welding quality of the workpiece is required.

SUMMARY

One aspect of the present disclosure provides a method of manufacturing a metal component The method includes: generating a laser beam; splitting the laser beam into a first laser beam and a second laser beam; reflecting the second laser beam; irradiating the first laser beam through a first condensing optical system to an irradiation position on a surface of a workpiece made of metal, wherein the first condensing optical system condenses the first laser beam; irradiating the second laser beam through a second condensing optical system to the irradiation position, wherein the second condensing optical system condenses the second laser beam; adjusting a spot diameter ratio, wherein the spot diameter ratio is a ratio of a first spot diameter to a second spot diameter, wherein the first spot diameter is a diameter of the first laser beam on the irradiation position, wherein the second spot diameter is a diameter of the second laser beam on the irradiation position; and moving the irradiation position to weld the workpiece.

BRIEF DESCRIPTION OF THE DRAWINGS

FIG. 1 is an explanatory view showing a schematic configuration of a laser welding apparatus in a first embodiment;

FIG. 4 is a reference drawing showing a state of general keyhole welding;

DETAILED DESCRIPTION

A. First Embodiment

Figure 1:
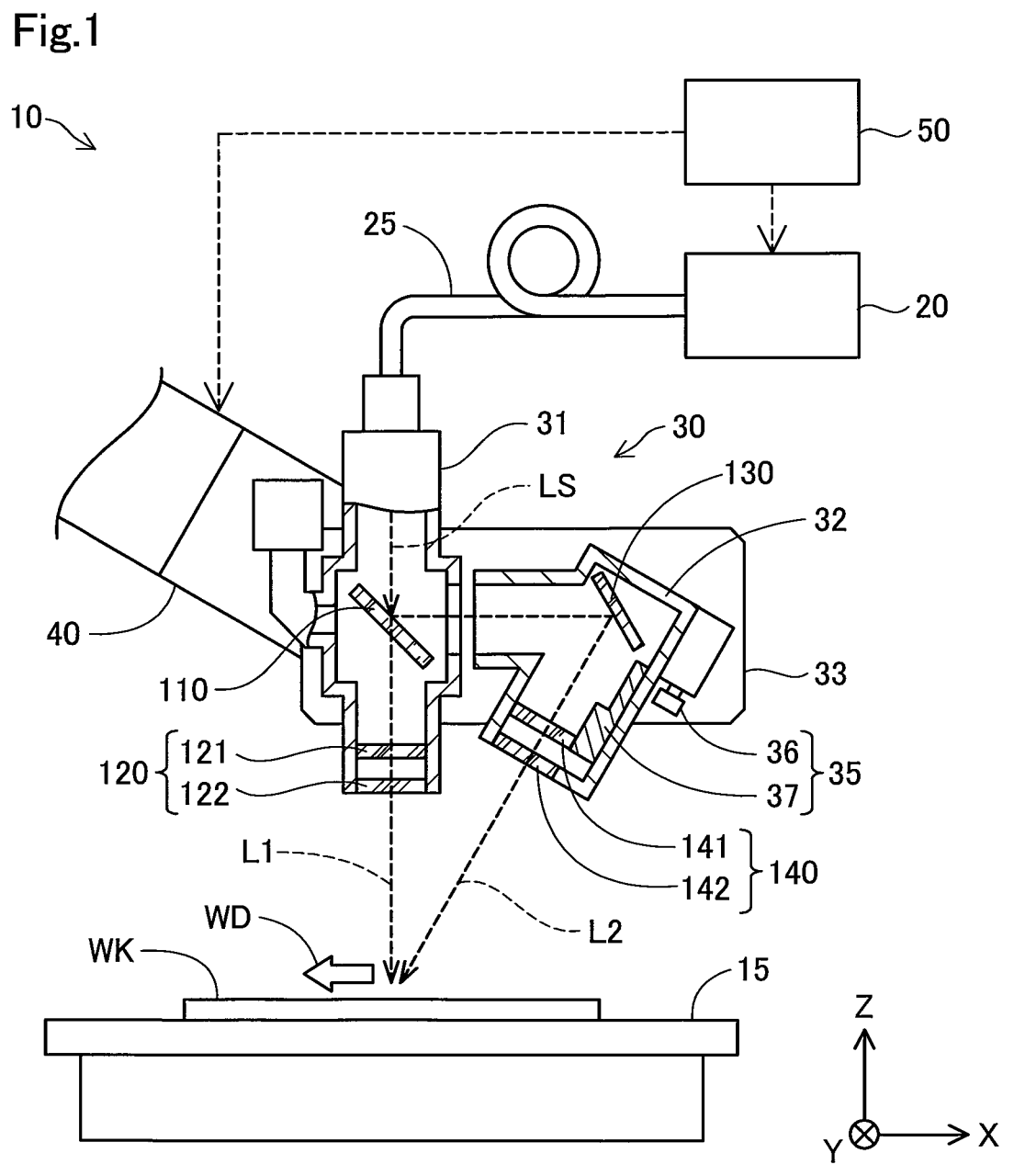
Figure 2:
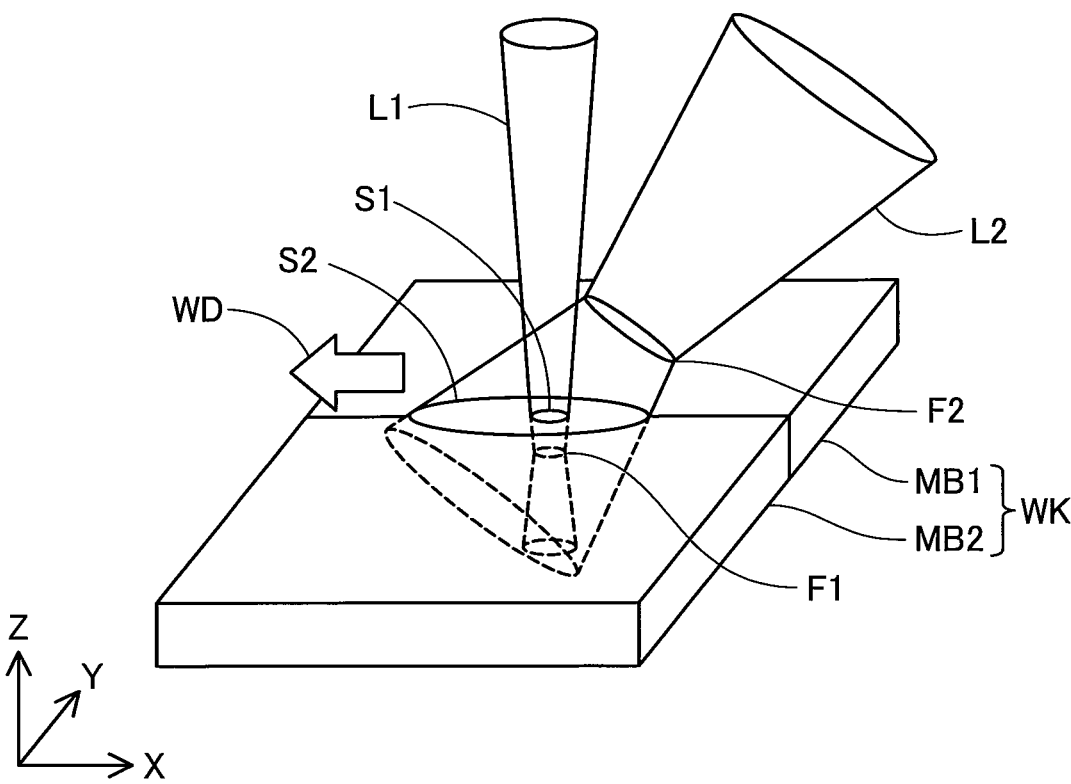
FIG. 2 is a perspective view showing a state in which a first laser beam and a second laser beam is irradiated to a workpiece.

FIG. 1 is an explanatory view showing a schematic configuration of a laser welding apparatus 10 used in a metal component manufacturing method in the first embodiment. In the present embodiment, the laser welding apparatus 10 includes a stage 15, a laser oscillator 20, an optical fiber 25, a laser head 30, a position changer 40, and a controller 50.

A workpiece WK is fixed to the stage 15. FIG. 1 illustrates arrows which indicate X, Y and Z axes which are three coordinate axes which are perpendicular to each other. The X axis is the coordinate axis which is parallel to the plane in contact with the workpiece WK of the stage 15, the Y axis is the coordinate axis which is parallel to the plane in contact with the workpiece WK of the stage 15, and the Z axis is the coordinate axis which is perpendicular to the plane in contact with the workpiece WK of the stage 15. The arrows which indicate the X, Y and Z axes are illustrated in other figures, too, as appropriate such that directions indicated by the arrows correspond to those in FIG. 1.

Workpiece WK is constituted by a plurality of metallic members to be welded to each other. A plurality of metallic members are welded together to produce a metal component. In the present embodiment, the members of the workpiece WK is made of steel. In other embodiments, the members of the workpiece WK is not made of steel, for example, may be made of aluminum-alloy or titanium-alloy. Materials of each member of the workpiece WK may be different from each other. For example, the workpiece WK may be constituted by a steel member and an aluminum-alloy member.

The laser oscillator 20 generates a laser beam LS. In this embodiment, the laser beam LS generated by the laser oscillator 20 is a fiber laser. In other embodiments, the laser beam LS generated by the laser oscillator 20 may be a solid-state laser other than the fiber laser such as a disk laser, a semiconductor laser, or a YAG laser, or a gas laser such as a carbon dioxide laser.

One end of the optical fiber 25 is connected to the laser oscillator 20, the other end of the optical fiber 25 is connected to the laser head 30. The optical fiber 25 transmits the laser beam LS from the laser oscillator 20 to the laser head 30. In the form in which the laser beam LS to be generated by the laser oscillator 20 is a carbon dioxide laser, the laser beam LS may be transmitted from the laser oscillator 20 to the laser head 30 by a bend mirror rather than the optical fiber 25.

The laser head 30 includes a first housing 31, a second housing 32, a fixing member 33, a beam splitter 110, a first condensing optical system 120, a mirror 130, a second condensing optical system 140, and a adjuster 35.

The first housing 31 is a cylindrical member. The distal end of the first housing 31 is directed toward the stage 15. At the rear end of the first housing 31, the optical fiber 25 is connected, the laser beam LS emitted from the optical fiber 25 is introduced into the first housing 31. The side surface portion of the first housing 31, an opening is provided.

The second housing 32 is disposed adjacent to the first housing 31 is fixed to the first housing 31 through the fixing member 33. The second housing 32 is a cylindrical member bent at an acute angle. The rear end portion of the second housing 32 is directed to the opening provided in the side surface portion of the first housing 31. The rear end portion of the second housing 32, an opening disposed opposite to the opening provided in the side surface portion of the first housing 31 is provided. The distal end of the second housing 32 is directed toward the stage 15.

The beam splitter 110 is disposed between the distal end portion of the first housing 31 and the rear end portion of the first housing 31. and is fixed to the first housing 31. The beam splitter 110 reflects a portion of the laser beam LS introduced into the first housing 31, and transmits the remaining portion of the laser beam LS. In the following description, the portion transmitted through the beam splitter 110 of the laser beam LS is referred to as a first laser beam L1, the portion reflected by the beam splitter 110 of the laser beam LS is referred to as a second laser beam L2. That is, the beam splitter 110 splits the laser beam LS into a first laser beam L1 and the second laser beam L2. In the present embodiment, a plate-type beam splitter in which optical thin film is deposited on a flat glass is used as the beam splitter 110. In other embodiments, for example, a cube-type beam splitter in which two right-angled prisms are combined may be used as the beam splitter 110.

In the present embodiment, the beam splitter 110 splits the laser beam LS into the first laser beam L1 and the second laser beam L2 so that the ratio between the intensity of the first laser beam L1 and the intensity of the second laser beam L2 is 65:35. In other embodiments, the beam splitter 110 may split the laser beam LS into the first laser beam L1 and the second laser beam L2 so that the ratio between the intensity of the first laser beam L1 and the intensity of the second laser beam L2 is 50:50. The beam splitter 110 that splits the laser beam LS into the first laser beam L1 and the second laser beam L2 so that the ratio between the intensity of the first laser beam L1 and the intensity of the second laser beam L2 is approximately 50:50 is sometimes called a half mirror.

The first condensing optical system 120 is disposed at the distal end of the first housing 31. The first condensing optical system 120 irradiates the workpiece WK by focusing the first laser beam L1 transmitted through the beam splitter 110. In the present embodiment, the first condensing optical system 120 includes a first collimating lens 121, and a first condensing lens 122. The first collimating lens 121 and the first condensing lens 122, from the rear end portion of the first housing 31 toward the distal end portion, are arranged in this order.

The first collimating lens 121 is fixed to the first housing 31. The first collimating lens 121 has a function of converting the first laser beam L1 transmitted through the beam splitter 110 into a collimated light.

The first condensing lens 122 is fixed to the first housing 31. The first condensing lens 122 has a function of focusing the first laser beam L1 converted into collimated light by the first collimating lens 121. The first laser beam L1 condensed by the first condensing lens 122 is irradiated to the workpiece WK.

The mirror 130 is disposed in the bent portion of the second housing 32 is fixed to the second housing 32. The second laser beam L2 reflected by the beam splitter 110, through the opening provided in the side surface portion of the first housing 31, is introduced into the second housing 32 from the opening provided in the rear end portion of the second housing 32. The mirror 130 reflects the second laser beam L2 introduced into the second housing 32.

The second condensing optical system 140 is disposed at the distal end of the second housing 32. The second condensing optical system 140, toward the part being irradiated with the first laser beam L1 of the workpiece WK, condenses the second laser beam L2 reflected by the mirror 130 to irradiate the workpiece WK. In the present embodiment, the second condensing optical system 140 has a second collimating lens 141, and a second condensing lens 142. The second collimating lens 141 and the second condensing lens 142, from the bent portion of the second housing 32 toward the distal end portion, are arranged in this order.

The second collimating lens 141 is fixed to the sliding member 37 of the adjuster 35 to be described later. The second collimating lens 141 has a function of converting the second laser beam L2 reflected by the mirror 130 into collimated light.

The second condensing lens 142 is fixed to the second housing 32. The second condensing lens 142 has a function of focusing the second laser beam L2 which is converted into collimated light by the second collimating lens 141. The second laser beam L2 condensed by the second condensing lens 142 is irradiated to the workpiece WK.

The adjuster 35 is provided in the second housing 32. The adjuster 35, by changing the distance between the second collimating lens 141 and the second condensing lens 142, the focal length of the second condensing optical system 140, in other words, the second collimating lens 141 and the second condensing lens 142 to change the combined focal length by. In the present embodiment, the adjuster 35 includes a screw 36 and a sliding member 37. The screw 36 is provided on the outside of the second housing 32. The sliding member 37 is provided along the inner wall surface of the second housing 32. As described above, the second collimating lens 141 is fixed to the sliding member 37. The sliding member 37, in response to rotation of the screw 36, by sliding movement on the inner wall surface of the second housing 32, to change the distance between the second collimating lens 141 and the second condensing lens 142. By the distance between the second collimating lens 141 and the second condensing lens 142 is changed, the focal length of the second condensing optical system 140 is changed. In this embodiment, the screw 36 is manually rotated. In other embodiments, a motor driven under the control of the controller 50 is provided in the laser head 30, the screw 36 may be rotated by the motor.

The position changer 40 changes the position of the laser head 30 relative to the workpiece WK in X, Y, Z axis. In the present embodiment, the position changer 40, by moving the laser head 30, to change the relative position of the laser head 30 with respect to the workpiece WK in X, Y, Z axis. The position changer 40, for example, is constituted by a robot arm such as a vertical articulated robot, the distal end portion of the robot arm, the fixing member 33 of the laser head 30 is fixed. In other embodiments, the position changer 40, by moving the stage 15 without moving the laser head 30, may change the relative position of the laser head 30 with respect to the workpiece WK in X, Y, Z axis. The position changer 40 may change the position of the laser head 30 relative to the workpiece WK in X, Y, Z axis by moving both the laser head 30 and the stage 15.

The controller 50 is configured as a computer having a CPU, a memory, and an input/output interface. In the present embodiment, the controller 50, by changing the relative position of the laser head 30 with respect to the workpiece WK by controlling the laser oscillator 20 while irradiating the first laser beam L1 and the second laser beam L2 with respect to the workpiece WK from the laser head 30, the position changer 40 welding the workpiece WK. The controller 50, rather than a computer, may be configured by a combination of a plurality of circuits.

FIG. 2, the first laser beam L1 and the second laser beam L2 on the workpiece WK by the laser welding apparatus 10 of this embodiment is a perspective view showing a state of being irradiated. In FIG. 2, as the workpiece WK, the first member MB1 and the second member MB2 which are arranged by butting the end faces to each other are represented. In the present embodiment, the first laser beam L1 is irradiated perpendicular to the surface of the workpiece WK. The second laser beam L2 is irradiated obliquely to the surface of the workpiece WK. The second laser beam L2 is irradiated to the surface of the workpiece WK from the rear of the welding directional WD with respect to the first laser beam L1. In the following explanation, the portion being irradiated with the first laser beam L1 of the surface of the workpiece WK is referred to as a first spot S1, the portion being irradiated with the second laser beam L2 of the surface of the workpiece WK is referred to as a second spot S2. In the present embodiment, a focal position F1 of the first laser beam L1 is disposed between the first spot S1 and the first condensing lens 122. A focal position F2 of the second laser beam L2, between the second spot S2 and the stage 15, in other words, it is disposed on the opposite side of the second condensing lens 142 with respect to the second spot S2.

Figure 3:
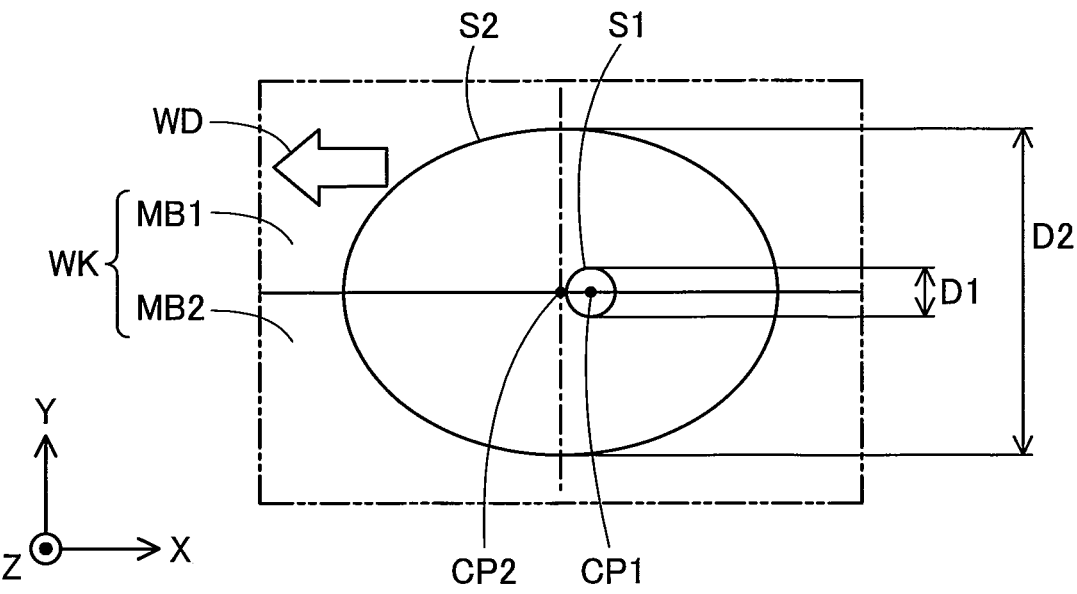
FIG. 3 is a plan view showing relationship between an irradiation position of the first laser beam and an irradiation position of the second laser beam.

FIG. 3 is a plan view showing relationship between an irradiation position of the first laser beam L1 and an irradiation position of the second laser beam L2. In FIG. 3, the workpiece WK viewed along the Z-axis, the first spot S1, and the second spot S2 are represented. In the present embodiment, the cross section of the first laser beam L1 perpendicular to the central axis of the first laser beam L1 is circular, and, since the first laser beam L1 is irradiated perpendicular to the surface of the workpiece WK, the first spot S1 has a circular shape. Section of the second laser beam L2 perpendicular to the central axis of the second laser beam L2 is circular, and, since the second laser beam L2 is irradiated obliquely to the surface of the workpiece WK, the second spot S2 has an elliptical shape. In the following explanation, a diameter of the first spot S1 is referred to as a spot diameter D1 of the first laser beam L1, a short diameter of the second spot S2 is referred to as a spot diameter D2 of the second laser beam L2. The first spot S1 is disposed within the second spot S2. A center point CP1 of the first spot S1 is disposed behind the welding directional WD with respect to a center point CP2 of the second spot S2. In the present embodiment, the distance from the center point CP1 of the first spot S1 to the center point CP2 of the second spot S2 is equal to or greater than the radius of the first spot S1.

In the laser welding apparatus 10 of this embodiment, by moving the laser head 30 along the central axis of the first laser beam L1 emitted from the first condensing lens 122, the focal position F1 of the first laser beam L1 and the focal position F2 of the second laser beam L2 can be changed simultaneously. Furthermore, in the laser welding apparatus 10 of this embodiment, by changing the focal length of the second condensing optical system 140 using the adjuster 35, without changing the focal position F1 of the first laser beam L1, the focal position of the second laser beam L2 it is possible to change F2. By the focal position F1 of the first laser beam L1 is changed, the spot diameter D1 of the first laser beam L1 is changed. By the focal position F2 of the second laser beam L2 is changed, the spot diameter D2 of the second laser beam L2 is changed. That is, by changing at least one of the focal position F1 and the focal position F2 of the second laser beam L2 of the first laser beam L1, the spot diameter D1 of the first laser beam L1 and the spot diameter D2 of the second laser beam L2 it is possible to change a spot diameter ratio D1/D2 which is the ratio. In the laser welding apparatus 10 of this embodiment, it is possible to adjust the spot diameter ratio D1/D2 to 5.0 percent or more and 15.0 percent or less.

FIG. 4 is a reference view schematically showing a state of general keyhole welding. In laser welding, keyhole welding may be performed to ensure a large penetration depth. In keyhole welding, the portion irradiated with the laser beam of the workpiece is evaporated to form a keyhole, a molten pool is formed around the keyhole. Of the wall surface surrounding the molten pool, the wall surface of the front side of the welding direction is referred to as a front wall. Since the molten metal between the front wall and the keyhole is pushed out by the evaporation reaction force from the keyhole, spatters of relatively large size that scatter from the front wall toward the front in the welding direction are generated. In addition, spatters of relatively small size that scatter from inside the keyhole toward the rear in the welding direction are generated. When spatter is generated, a problem in which the spatter adheres to the laser head or the like, the strength of the workpiece by the thickness of the welded portion of the workpiece is reduced may occur such as a problem.

Figure 5:
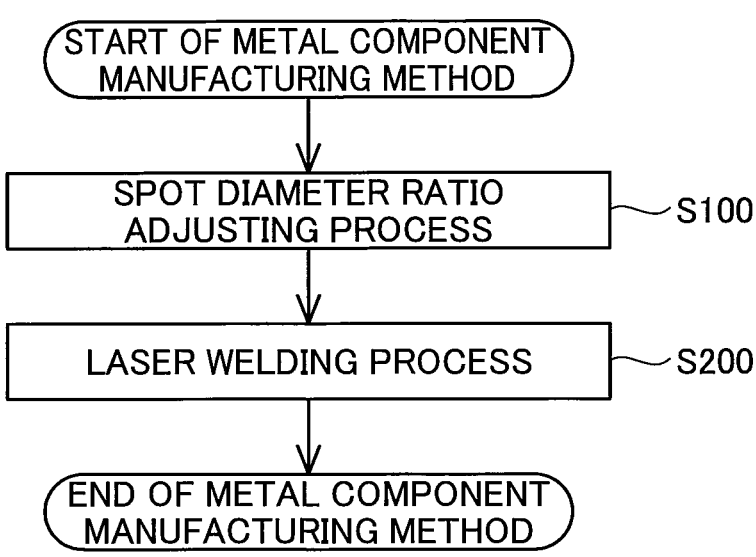
FIG. 5 is a flow chart showing contents of a metal component manufacturing method in the first embodiment.

FIG. 5 is a flowchart showing the contents of a metal component manufacturing method in the present embodiment. First, in a spot diameter ratio adjusting process (a step S100), the spot diameter ratio D1/D2, which is the ratio of the spot diameter D1 of the first laser beam L1 and the spot diameter D2 of the second laser beam L2, is adjusted. In the present embodiment, by the spot diameter D2 of the second laser beam L2 is changed by changing the distance between the second collimating lens 141 and the second condensing lens 142 using the adjuster 35, the spot diameter ratio D1/D2 is adjusted. Next, in a laser welding process (a step S200), the workpiece WK is welded. The specific contents of the laser welding process will be described later. Metal components are manufactured by welding workpiece WK in the laser-welding process. The method is then terminated. Incidentally, after the laser welding process, a finishing process may be applied to the metal part. For example, the spot diameter ratio adjustment step of the step S100 may be skipped if the adjustment of the spot diameter ratio D1/D2 is not required, such as when repeatedly manufacturing the same type of metal component.

Figure 6:
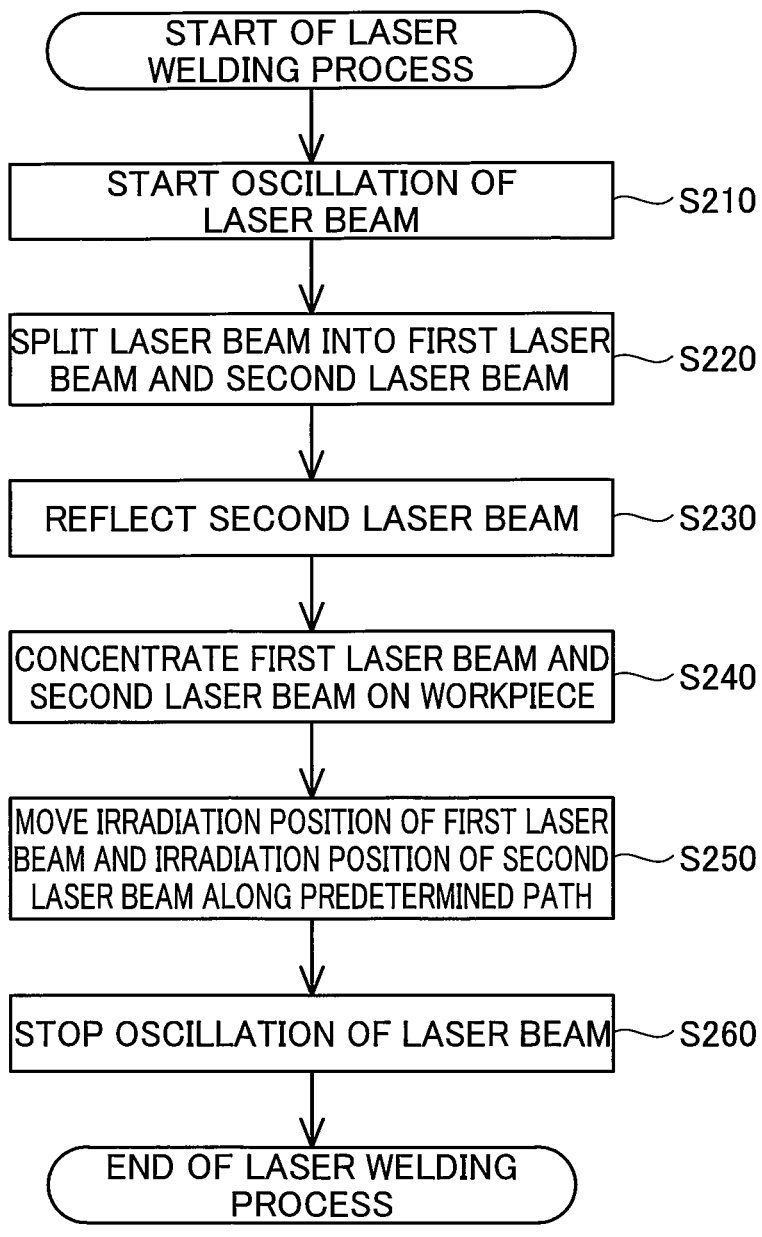
FIG. 6 is a flow chart showing the contents of laser welding process in the metal component manufacturing method.

FIG. 6 is a flowchart showing the contents of the laser welding process of the metal component manufacturing method described above. First, in a step S210, the laser oscillator 20 starts oscillation of the laser beam LS. The laser beam LS oscillated by the laser oscillator 20 is transmitted to the laser head 30 through the optical fiber 25. Next, in a step S220, the beam splitter 110 splits the laser beam LS introduced into the laser head 30 to the first laser beam L1 and the second laser beam L2. In a step S230, the mirror 130 reflects the second laser beam L2, changing the traveling direction of the second laser beam L2. In a step S240, the first condensing optical system 120 condenses the first laser beam L1 on the workpiece WK, the second condensing optical system 140, the first laser beam L1 of the workpiece WK condenses the second laser beam L2 on the part to be condensed. The steps from the step S210 to the step S240 are executed almost simultaneously. By first laser beam L1 on the surface of the workpiece WK is irradiated, together with the keyhole is formed on the workpiece WK, by the second laser beam L2 on the surface of the workpiece WK is irradiated, molten pool is formed on the workpiece WK so as to surround the keyhole. In a step S250, the position changer 40 moves the irradiation position of the first laser beam L1 and the irradiation position of the second laser beam L2 along a predetermined path by relatively moving the laser head 30 with respect to the workpiece WK. By the irradiation position of the irradiation position and the second laser beam L2 of the first laser beam L1 is moved along the path, the workpiece WK is welded along the path. In a step S260, the laser oscillator 20 terminates the oscillation of the laser beam LS. This step is then terminated.

In the laser welding apparatus 10 of this embodiment, by forming a molten pool by a second laser beam L2 with forming a keyhole by the first laser beam L1, it is possible to suppress the occurrence of sputtering. In order to effectively suppress the generation of sputtering, depending on the material and penetration depth required of the workpiece WK, it is preferable that the spot diameter specific D1/D2 is adjusted in advance.

Figure 7:
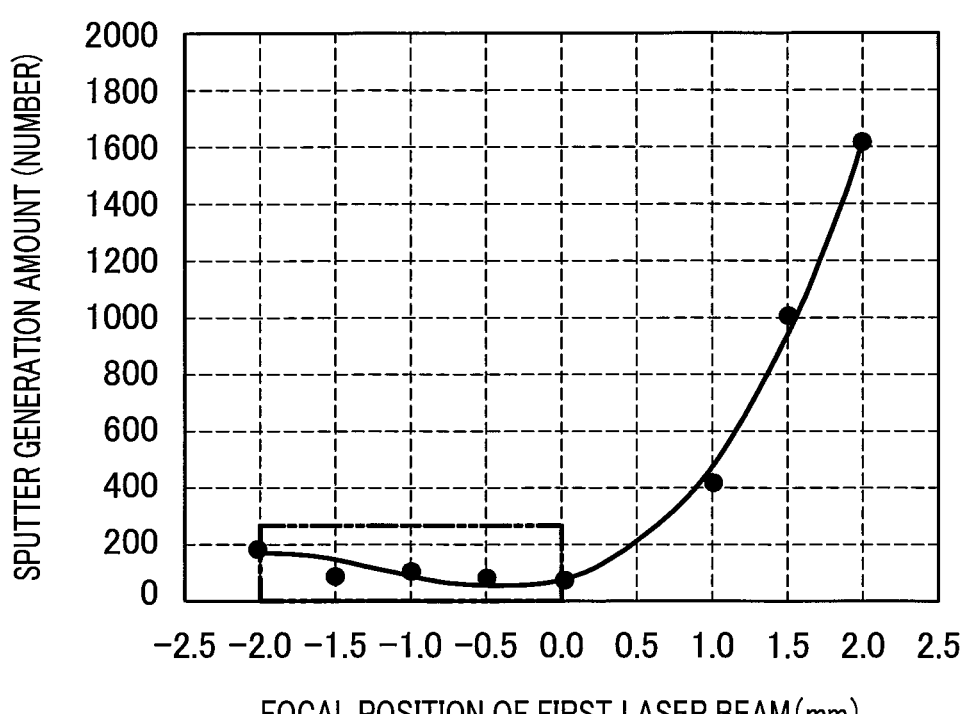
FIG. 7 is a graph showing relationship between a focal position of the first laser beam and a sputter generation amount.

FIG. 7 is a graph showing a test result regarding the relation between the focal position F1 of the first laser beam L1 and a sputter generation amount. In FIG. 0.7, the horizontal axis represents the focal position F1 of the first laser beam L1 in the Z axis, the vertical axis represents the sputter generation. Sputter generation amount is represented by the number of spatters. In this test, by welding a plurality of samples with different focal position F1 of the first laser beam L1, the relation between the focal position F1 of the first laser beam L1 and the sputter generation was examined. The welding of each sample, the laser welding apparatus 10 described above was used. A high-speed camera was used to measure the amount of spatter generated. The material for each sample is steel. The weld rate when the specimens are welded is less than 10.0 m/min. The weld length of the individual specimens is 100.0 mm. In this test, with the focal position F2 of the second laser beam L2 in the Z-axis is fixed at the position of Z=15.0 mm, the respective samples were welded. Z=0.0 mm is the position of the surface of the sample, Z>0.0 mm is a position close to the laser head 30 as compared to the surface of the sample, Z<0.0 mm is a position close to the stage 15 as compared to the surface of the sample. In FIG. 7, the test results are represented by circles. As shown in FIG. 7, when the focal position F1 of the first laser beam L1 in the Z-axis is at the position of Z=−2.0 mm or more and Z=0.0 mm or less, the sputter generation rate is relatively small.

Figure 8:
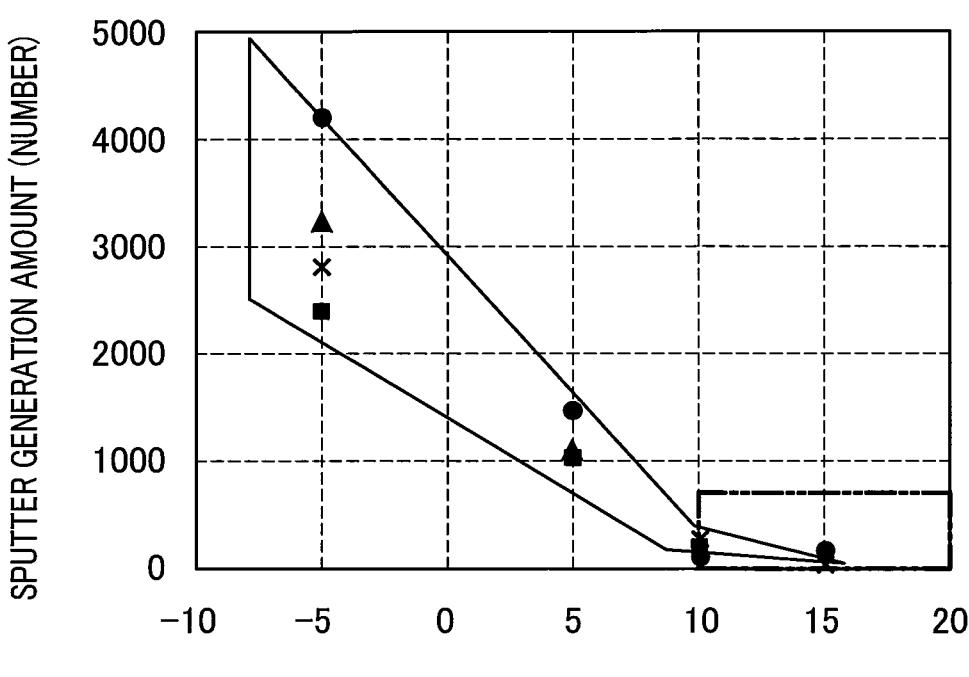
FIG. 8 is a graph showing relationship between the focal position of the second laser beam and the sputter generation amount.

FIG. 8 is a graph showing a test result regarding the relation between the focal position F2 and the sputtering generation amount of the second laser beam L2. In FIG. 8, the horizontal axis represents the focal position F2 of the second laser beam L2 in the Z axis, the vertical axis represents the sputter generation. In this test, by welding a plurality of samples with different focal position F2 of the second laser beam L2, the relation between the focal position F2 of the second laser beam L2 and the sputter generation was examined. Laser welding apparatus 10 used for welding of each sample, a method of measuring the sputter generation amount, the material of the sample, the welding speed, the welding length is the same as the test described above. In this study, with the focal position F1 of the first laser beam L1 is fixed at a position of Z=−2.0 or more and Z=0.0 mm or less, the respective samples were welded. In FIG. 8, circles, triangles, crosses, and squares represent different test results of the focal position F1 of the first laser beam L1. As shown in FIG. 8, when the focal position F2 of the second laser beam L2 is at a position of Z=10.0 mm or more and Z=20.0 mm or less, the sputter generation rate is relatively small.

Figure 9:
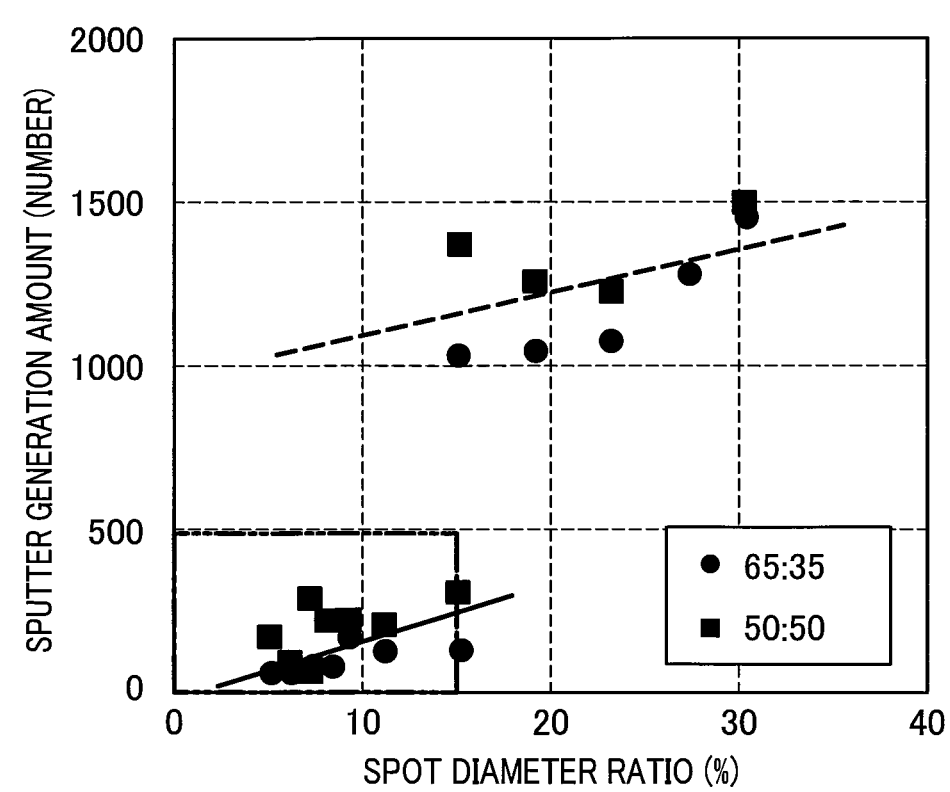
FIG. 9 is a graph showing relationship between a spot diameter ratio and the sputter generation amount.

FIG. 9 is a graph showing the test results on the relation between the spot diameter ratio D1/D2 and the sputter generation amount. In FIG. 9, the horizontal axis represents the spot diameter ratio D1/D2 is the ratio of the spot diameter D1 of the first laser beam L1 and the spot diameter D2 of the second laser beam L2, the vertical axis represents the sputter generation. In this test, the relation between the spot diameter ratio D1/D2 and sputter generation quantity was examined by welding plural samples with different the spot diameter ratio D1/D2. Laser welding apparatus 10 used for welding of each sample, a method of measuring the sputter generation amount, the material of the sample, the welding speed, the welding length is the same as each test described above. In FIG. 9, the test results when the ratio of the intensity of the first laser beam L1 and the intensity of the second laser beam L2 is 65:35 beam splitter 110 is used is represented by a circle, the ratio of the intensity of the first laser beam L1 and the intensity of the second laser beam L2 50:50 the test results when the beam splitter 110 is used is represented by a square mark. As shown in FIG. 9, when the spot diameter ratio D1/D2 is 5.0% or more and 15.0% or less, the sputter generation rate is relatively small. Although the test results when the spot diameter ratio D1/D2 is more than 0.0% and less than 5.0% is not represented in FIG. 9, since the smaller the spot diameter ratio D1/D2 is small sputtering amount, even when the spot diameter ratio D1/D2 is more than 0.0% and less than 5.0%, the sputtering amount is considered to be relatively small.

Figure 10:
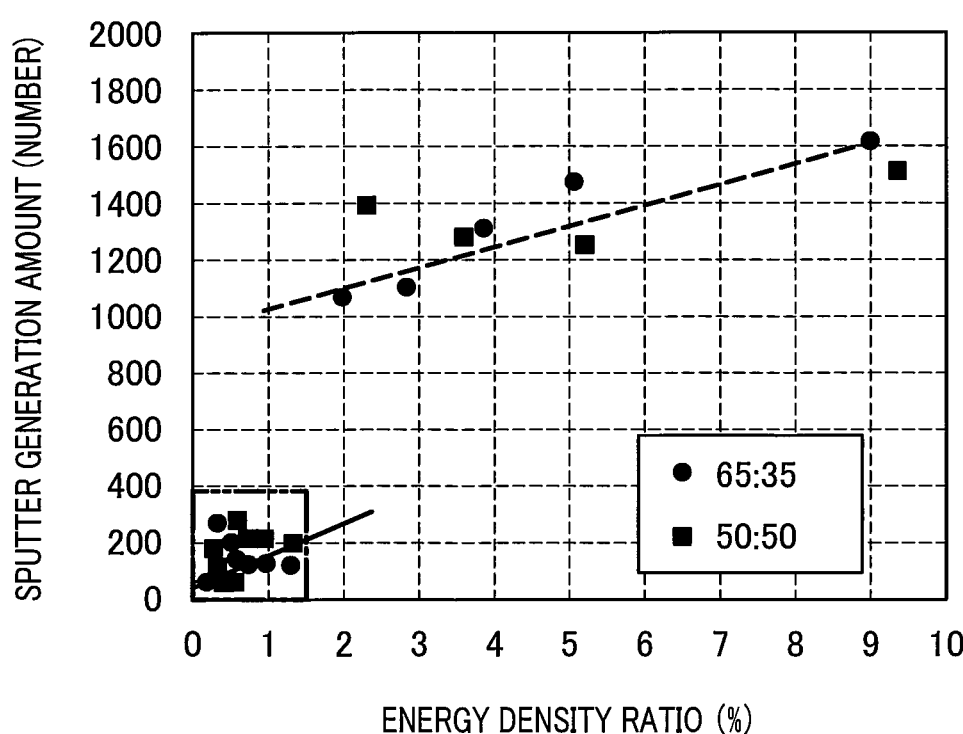
FIG. 10 is a graph showing relationship between an energy density ratio and the sputter generation amount.

FIG. 10 is a graphical representation of an energy density u2/u1 versus sputter yield versus test results. In FIG. 10, the horizontal axis represents the energy density ratio u2/u1 is the ratio of the energy density u1 of the first laser beam L1 at the surface of the energy density u2 and the sample of the second laser beam L2 on the surface of the sample, the vertical axis represents the sputter generation. In this test, the relation between energy density ratio u2/u1 and sputter generation quantity was examined by welding plural samples with different energy density ratio u2/u1. Laser welding apparatus 10 used for welding of each sample, a method of measuring the sputter generation amount, the material of the sample, the welding speed, the welding length is the same as each test described above. In FIG. 10, the test results when the ratio of the intensity of the first laser beam L1 and the intensity of the second laser beam L2 is 65:35 beam splitter 110 is used is represented by a circle, the ratio of the intensity of the first laser beam L1 and the intensity of the second laser beam L2 50: test results when 50 of the beam splitter 110 is used is represented by triangular marks. As shown in FIG. 10, when the energy density specific u2/u1 is more than 0.0% and 1.5% or less, the sputter generation rate is relatively small.

Figure 11:
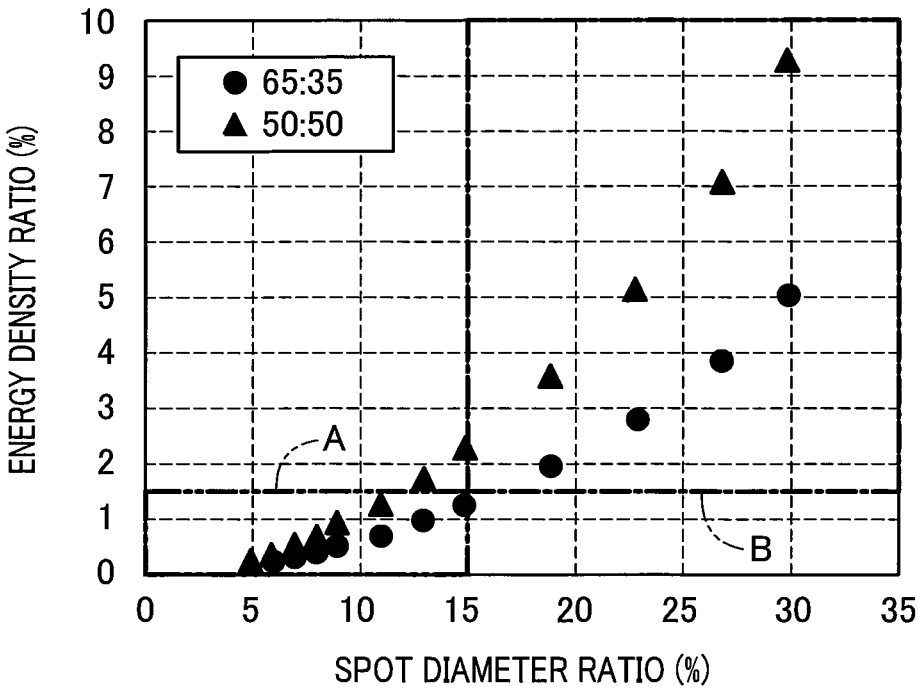
FIG. 11 is a graph showing relationship between the spot diameter ratio and the energy density ratio.

FIG. 11 is a graph showing relationship between the spot diameter ratio D1/D2 and an energy density ratio u2/u1. In FIG. 11, the horizontal axis represents the spot diameter ratio D1/D2, the vertical axis represents the energy density ratio u2/u1. In FIG. 11, when the beam splitter 110 having a ratio of the intensity of the first laser beam L1 to the intensity of the second laser beam L2 of 65:35 is used, the relationship between the spot diameter ratio D1/D2 and the energy density ratio u2/u1 is represented by circles, and when the beam splitter 110 having a ratio of the intensity of the first laser beam L1 to the intensity of the second laser beam L2 of 50:50 is used, the relationship between the spot diameter ratio D1/D2 and the energy density ratio u2/u1 is represented by triangles. In FIG. 11, the spot diameter ratio D1/D2 is more than 0.0 percent and 15.0 percent or less, the area A energy density ratio u2/u1 is more than 0.0 percent and 1.5 percent or less, the spot diameter ratio D1/D2 is more than 15 percent, the energy density ratio u2/u1 is represented area B that exceeds 1.5 percent. As shown in FIG. 9, towards the sputter generation amount when the spot diameter ratio D1/D2 is more than 0.0% and 15.0% or less, less than the sputter generation amount when the spot diameter ratio D1/D2 is more than 15.0%. Furthermore, as shown in FIG. 10, the amount of sputter generation when the energy density ratio u2/u1 is more than 0.0% and 1.5% or less, less than the amount of sputter generation when the energy density ratio u2/u1 is more than 1.5%. That is, the amount of spatter generation is small in the area A as compared with the area B.

Figure 12:
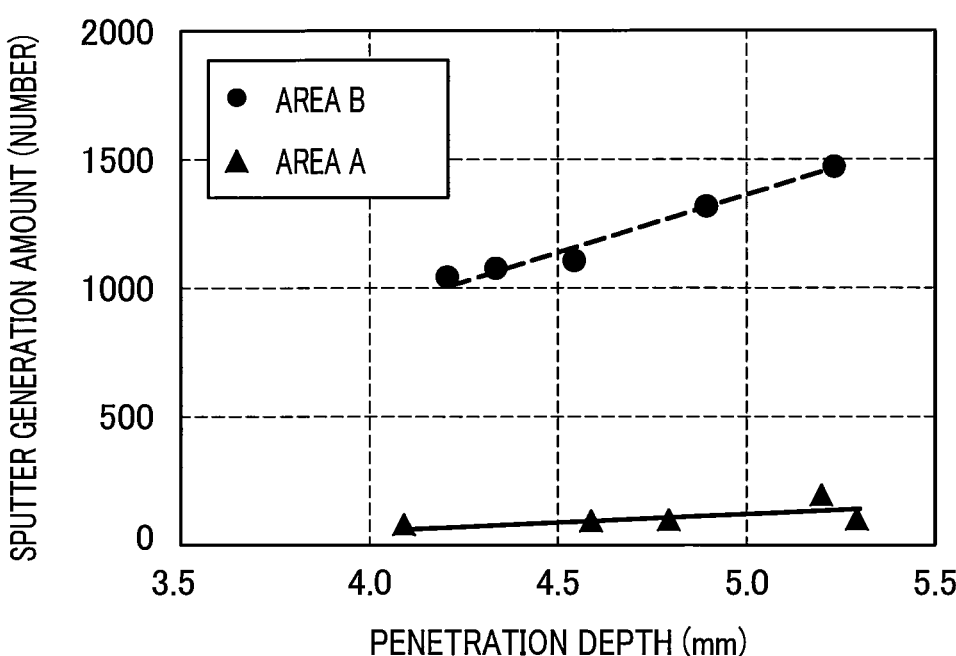
FIG. 12 is a graph showing relationship between penetration depth and the sputter generation amount.

FIG. 12 is a graph showing the test results on the relationship between the penetration depth and the sputtering amount. In FIG. 12, the horizontal axis represents the penetration depth, the vertical axis represents the sputtering amount. In this test, the relationship between penetration depth and spatter generation quantity was examined by welding multiple samples with different penetration depth. Laser welding apparatus 10 used for welding of each sample, a method of measuring the sputter generation amount, the material of the sample, the welding speed, the welding length is the same as each test described above. In FIG. 12, the amount of spatter when welded under the conditions of the area A shown in FIG. 11 are represented by triangular marks, the amount of spatter when welded under the conditions of the area B shown in FIG. 11 are represented by circles. As shown in FIG. 12, when the penetration depth is the same, the amount of spatter generated when welded under the conditions of the area A is less than the amount of spatter generated when welded under the conditions of the area B.

According to the manufacturing method of the metal component in the present embodiment described above, the laser beam LS from the laser oscillator 20 is branched to the first laser beam L1 and the second laser beam L2 by the beam splitter 110, the first laser beam L1 and the second laser beam L2 are irradiated to the workpiece WK through the condensing optical system 120,140 that differ from each other. At least one of the first condensing optical system 120 for focusing the first laser beam L1 and the second condensing optical system 140 for focusing the second laser beam L2, since it is configured to be capable of changing the spot diameter D1,D2 on the surface of the workpiece WK, depending on the material and the required weld quality of the workpiece WK, the spot diameter D1 of the first laser beam L1 and the spot diameter D2 of the second laser beam L2 it is possible to easily adjust the spot diameter ratio D1/D2 which is the ratio. In particular, in the present embodiment, the adjuster 35 for changing the focal length of the second condensing optical system 140 by changing the distance between the second collimating lens 141 and the second condensing lens 142 of the second condensing optical system 140 is provided in the laser head 30. Therefore, by changing the spot diameter D2 of the second laser beam L2 using the adjuster 35, it is possible to easily adjust the spot diameter ratio D1/D2. Furthermore, in the present embodiment, since the laser beam LS oscillated by one laser oscillator 20 is branched to the first laser beam L1 and the second laser beam L2 by the beam splitter 110, the laser oscillator for oscillating the first laser beam L1 and the second laser beam L2 can be miniaturized laser welding apparatus 10 as compared with the form in which the laser oscillator is provided separately.

Further, in the present embodiment, the laser welding apparatus 10 can adjust the spot diameter ratio D1/D2 to 5.0 percent or more and 15.0 percent or less. Therefore, it is possible to suppress the generation of spatter when welding the workpiece WK. In particular, it is possible to suppress the generation of spatter when welding steel workpiece WK.

Further, in the present embodiment, the laser welding apparatus 10 can adjust the energy density specific u2/u1 to more than 0.0% and 1.5% or less. Therefore, it is possible to suppress the generation of spatter when welding the workpiece WK. In particular, it is possible to suppress the generation of spatter when welding steel workpiece WK.

Further, in the present embodiment, the laser welding apparatus 10 is disposed a focal position F1 of the first laser beam L1 between the first spot S1 and the first condensing lens 122, the second condensing lens 142 with respect to the second spot S2 it is possible to place the focal position F2 of the second laser beam L2 on the other side. By placing the focal position F1 of the first laser beam L1 between the first spot S1 and the first condensing lens 122, it is easy to secure the depth of the keyhole. By placing the focal position F2 of the second laser beam L2 on the other side of the second condensing lens 142 with respect to the second spot S2, it is easy to secure the width of the molten pool. Therefore, it is possible to suppress the generation of spatter when welding the workpiece WK. In particular, it is possible to suppress the generation of spatter when welding steel workpiece WK.

Further, the laser welding apparatus 10 may place the center point CP1 of the first spot S1 behind the welding directional WD relative to the center point CP2 of the second spot S2. Therefore, by ensuring the distance between the front wall and the keyhole of the molten pool, it is possible to suppress the occurrence of spatter when welding the workpiece WK.

B. Other Embodiments (B1) The laser welding apparatus 10 used in the method of manufacturing a metal component of the embodiment described above, the adjuster 35 is provided in the second housing 32 of the laser head 30. In contrast, without the adjuster 35 is provided in the laser welding apparatus 10, the first condensing optical system 120 is detachably fixed to the first housing 31, the second condensing optical system 140 may be detachably fixed to the second housing 32. In this case, depending on the material and the required weld quality of the workpiece WK, by replacing at least one of the first condensing optical system 120 and the second condensing optical system 140 to the condensing optical system having a different focal length, the spot diameter D1 of the first laser beam L1 and at least one of the spot diameter D2 of the second laser beam L2 can be changed. That is, by replacing at least one of the first condensing optical system 120 and the second condensing optical system 140 to the condensing optical system having differing focal length, it is possible to easily change the spot diameter ratio D1/D2.

(B2) The laser welding apparatus 10 used in the manufacturing process of the metal component of the embodiment described above, the adjuster 35 for changing the spot diameter D2 of the second laser beam L2 in the surface of the workpiece WK by changing the distance between the second collimating lens 141 and the second condensing lens 142 It is provided. In contrast, the laser welding apparatus 10, without the adjuster 35 is provided, an adjuster changing the spot diameter D1 of the first laser beam L1 on the surface of the workpiece WK by changing the interval between the first collimating lens 121 and the first condensing lens 122 may be provided. The laser welding apparatus 10, the adjuster 35 for changing the spot diameter D1 of the first laser beam L1 and the adjuster for changing the spot diameter D2 of the second laser beam L2 may be provided.

(B3) In the laser welding process in the manufacturing method of the metal component of the embodiment described above, the workpiece WK in the following conditions 5.0 percent or more and 15.0 percent of the spot diameter D2 of the second laser beam L2 at the surface of the spot diameter D1 of the first laser beam L1 on the surface of the workpiece WK is welded. In contrast, in the laser welding process in the manufacturing method of the metal component, In the laser welding process in the manufacturing method of the metal component, the workpiece WK may be welded while the spot diameter D1 of the first laser beam L1 on the surface of the workpiece WK is less than 5.0% of the spot diameter D2 of the second laser beam L2 on the surface of the workpiece WK. In the laser welding process in the manufacturing process of the metal component, the workpiece WK may be welded while the spot diameter D1 of the first laser beam L1 on the surface of the workpiece WK exceeds 15.0% of the spot diameter D2 of the second laser beam L2 on the surface of the workpiece WK.

(B4) In the laser welding process in the manufacturing method of the metal component of the embodiment described above, the focal position F1 of the first laser beam L1 is disposed between the first spot S1 and the first condensing lens 122, the second laser beam L2 the focal position F2 is the workpiece WK is welded while being disposed on the other side from the second condensing lens 142 with respect to the spot S2. In contrast, in the laser welding process in the manufacturing method of the metal component, the workpiece WK may be welded in a state where the focal position F1 of the first laser beam L1 is disposed on the opposite side to the first condensing lens 122 with respect to the first spot S1, the focal position F2 of the second laser beam L2 is disposed between the second spot S2 and the second condensing lens 142 workpiece WK may be welded.

(B5) In the laser welding process in the manufacturing method of the metal component of the embodiment described above, the workpiece WK is welded in the following condition 1.5% of the energy density u1 of the first laser beam L1 energy density u2 of the second laser beam L2 on the surface of the workpiece WK. In contrast, in the laser welding process in the manufacturing method of the metal component, the workpiece WK may be weld while the energy density u2 of the second laser beam L2 on the surface of the workpiece WK exceeds 1.5% of the energy density u1 of the first laser beam L1 on the surface of the workpiece WK.

(B6) In the laser welding process in the manufacturing process of the metal component of the embodiment described above, the workpiece WK is welded while the center point CP1 of the first spot S1 is disposed behind the welding directional WD with respect to the center point CP2 of the second spot S2. In contrast, in the laser welding process in the manufacturing method of the metal component, the workpiece WK may be welded while the center point CP1 of the first spot S1 and the center point CP2 of the second spot S2 are overlapped. In the laser welding process in the manufacturing method of the metal component, the workpiece WK may be welded while the center point CP1 of the first spot S1 is disposed in front of the welding directional WD with respect to the center point CP2 of the second spot S2.

The disclosure is not limited to any of the embodiment and its modifications described above but may be implemented by a diversity of configurations without departing from the scope of the disclosure. For example, the technical features of any of the above embodiments and their modifications may be replaced or combined appropriately, in order to solve part or all of the problems described above or in order to achieve part or all of the advantageous effects described above. Any of the technical features may be omitted appropriately unless the technical feature is described as essential in the description hereof. The present disclosure may be implemented by aspects described below.

(1) In one aspect of the present disclosure, a method of manufacturing a metal component is provided. The method includes: generating a laser beam; splitting the laser beam into a first laser beam and a second laser beam; reflecting the second laser beam; irradiating the first laser beam through a first condensing optical system to an irradiation position on a surface of a workpiece made of metal, wherein the first condensing optical system condenses the first laser beam; irradiating the second laser beam through a second condensing optical system to the irradiation position, wherein the second condensing optical system condenses the second laser beam; adjusting a spot diameter ratio, wherein the spot diameter ratio is a ratio of a first spot diameter to a second spot diameter, wherein the first spot diameter is a diameter of the first laser beam on the irradiation position, wherein the second spot diameter is a diameter of the second laser beam on the irradiation position; and moving the irradiation position to weld the workpiece.

According to the method of this form, the laser beam is split into a first laser beam and a second laser beam, the first laser beam and the second laser beam is irradiated to the workpiece through a different condensing optical system from each other. Furthermore, at least one of the first condensing optical system and the second condensing optical system, the spot diameter at the surface of the workpiece It is configured to be changeable. Therefore, depending on the material and welding quality required of the workpiece, it is possible to easily adjust the ratio of the spot diameter of the spot diameter and the second laser beam of the first laser beam.

(2) According to the method of the above aspect, the second condensing optical system may include a plurality of lenses; and adjusting may change an interval of the lenses to adjust the spot diameter ratio.

According to the method of this form, by changing the interval of the lens of the second condensing optical system, it is possible to easily adjust the spot diameter ratio.

(3) According to the method of the above aspect, the first spot diameter may be 5.0 percent or more and 15.0 percent or less of the second spot diameter.

According to the method of this form, it is possible to suppress the occurrence of sputtering when welding the workpiece. In particular, it is possible to suppress the occurrence of spatter when welding a steel workpiece.

(4) According to the method of the above aspect, a focal position of the first laser beam may be disposed between the irradiation position and the first condensing optical system; and the irradiation position may be disposed between a focal position of the second laser beam and the second condensing optical system.

According to the method of this form, it is possible to suppress the occurrence of sputtering when welding the workpiece. In particular, it is possible to suppress the occurrence of spatter when welding a steel workpiece.

(5) According to the method of the above aspect, an energy density of the second laser beam on the irradiation position may be 1.5% or less of an energy density of the first laser beam on the irradiation position.

According to the method of this form, it is possible to suppress the occurrence of sputtering when welding the workpiece. In particular, it is possible to suppress the occurrence of spatter when welding a steel workpiece.

(6) According to the method of the above aspect, a center of the first laser beam on the irradiation position may be disposed behind a center of the second laser beam on the irradiation position in a moving direction of the irradiation position.

According to the method of this form, it is possible to suppress the occurrence of sputtering when welding the workpiece.

It is also possible to realize the present disclosure in various forms other than the method of manufacturing a metal component. For example, a laser welding method, a laser welding apparatus, can be realized in the form of a laser head or the like.

What is claimed is:

1. A method of manufacturing a metal component, the method comprising:
generating a laser beam;
splitting the laser beam into a first laser beam and a second laser beam;
reflecting the second laser beam;
irradiating the first laser beam through a first condensing optical system to an irradiation position on a surface of a workpiece made of metal, wherein the first condensing optical system condenses the first laser beam;
irradiating the second laser beam through a second condensing optical system to the irradiation position, wherein the second condensing optical system condenses the second laser beam;
adjusting a spot diameter ratio, wherein the spot diameter ratio is a ratio of a first spot diameter to a second spot diameter, wherein the first spot diameter is a diameter of the first laser beam on the irradiation position, wherein the second spot diameter is a diameter of the second laser beam on the irradiation position; and
moving the irradiation position to weld the workpiece,
wherein after the adjusting, the first spot diameter is 5.0 percent or more and 15.0 percent or less of the second spot diameter,
wherein after the adjusting, an energy density of the second laser beam on the irradiation position is 1.5 percent or less of an energy density of the first laser beam on the irradiation position,
wherein after the adjusting, a first focal position is located within a range of 0.0 mm or more and 2.0 mm or less from the surface of the workpiece in a direction from the first condensing optical system to the surface of the workpiece, wherein first focal position is a focal position of the first laser beam, and
wherein after the adjusting, a second focal position is located within a range of 10.0 mm or more and 20.0 mm or less from the surface of the workpiece in a direction from the surface of the workpiece to the first condensing optical system, wherein the second focal position is a focal position of the second laser beam.

2. The method according to claim 1, wherein
the second condensing optical system includes a plurality of lenses; and
the adjusting changes an interval of the lenses to adjust the spot diameter ratio.

3. The method according to claim 1, wherein
a center of the first laser beam on the irradiation position is disposed behind a center of the second laser beam on the irradiation position in a moving direction of the irradiation position.

4. A laser welding apparatus comprising:
a laser oscillator generating a laser beam;
a beam splitter splitting the laser beam into a first laser beam and a second laser beam;
a mirror reflecting the second laser beam;
a first condensing optical system condensing the first laser beam, the first condensing optical system irradiating the first laser beam to an irradiation position on a surface of a workpiece made of metal;
a second condensing optical system condensing the second laser beam reflected by the mirror, the second condensing optical system irradiating the second laser beam to the irradiation position;
an adjuster adjusting a spot diameter ratio, wherein the spot diameter ratio is a ratio of a first spot diameter to a second spot diameter, wherein the first spot diameter is a diameter of the first laser beam on the irradiation position, wherein the second spot diameter is a diameter of the second laser beam on the irradiation position; and
a controller configured to control the adjuster such that the first spot diameter is 5.0 percent or more and 15.0 percent or less of the second spot diameter,
an energy density of the second laser beam on the irradiation position is 1.5 percent or less of an energy density of the first laser beam on the irradiation position,
a first focal position is located within a range of 0.0 mm or more and 2.0 mm or less from the surface of the workpiece in a direction from the first condensing optical system to the surface of the workpiece, wherein first focal position is a focal position of the first laser beam, and a second focal position is located within a range of 10.0 mm or more and 20.0 mm or less from the surface of the workpiece in a direction from the surface of the workpiece to the first condensing optical system, wherein the second focal position is a focal position of the second laser beam.

5. The laser welding apparatus according to claim 4, wherein the second condensing optical system includes a plurality of lenses; and the adjuster changes an interval of the lenses to adjust the spot diameter ratio.

\* \* \* \* \*